United States Patent
Laserson et al.

(10) Patent No.: US 12,307,451 B2
(45) Date of Patent: May 20, 2025

(54) MEDIA REPLENISHMENT PREDICTOR

(71) Applicant: NCR Voyix Corporation, Atlanta, GA (US)

(72) Inventors: Itamar David Laserson, Givat Shmuel (IL); Norman Leonard Trujillo, Frisco, TX (US)

(73) Assignee: NCR Voyix Corporation, Atlanta, GA (US)

( * ) Notice: Subject to any disclaimer, the term of this patent is extended or adjusted under 35 U.S.C. 154(b) by 36 days.

(21) Appl. No.: 17/713,370

(22) Filed: Apr. 5, 2022

(65) Prior Publication Data

US 2023/0316271 A1    Oct. 5, 2023

(51) Int. Cl.
| | |
|---|---|
| *G06Q 20/38* | (2012.01) |
| *G06N 20/00* | (2019.01) |
| *G06Q 20/20* | (2012.01) |
| *G07G 1/00* | (2006.01) |
| *G07G 1/14* | (2006.01) |

(52) U.S. Cl.
CPC .......... *G06Q 20/389* (2013.01); *G06N 20/00* (2019.01); *G06Q 20/202* (2013.01); *G07G 1/0009* (2013.01); *G07G 1/14* (2013.01)

(58) Field of Classification Search
CPC .................................................. G06Q 20/389
See application file for complete search history.

(56) References Cited

U.S. PATENT DOCUMENTS

2022/0343450 A1*  10/2022  Vemparala ............. G06Q 50/34

FOREIGN PATENT DOCUMENTS

KR    20220032328    *  3/2022    ............ G06Q 40/02

OTHER PUBLICATIONS

Khurana, in "Fraud detection in eCommerce Payment Systems: The Role of Predictive AI in Real-Time Transaction Security and Risk Management," from International Journal of Applied Machine Learning and Computational Intelligence, 2020 (Year: 2020).*

* cited by examiner

Primary Examiner — Olabode Akintola
Assistant Examiner — Brandon M Duck
(74) *Attorney, Agent, or Firm* — Schwegman Lundberg & Woessner, P.A.

(57) ABSTRACT

Historical transaction data, events, replenishment activities, and terminal statuses for terminals of a given store are obtained. The data is preprocessed to include calculated terminal traffic patterns, cash usage patterns, and elapsed time until a replenishment activity for a given interval of time on per terminal. A machine-learning model (MLM) is trained on the modified data to configure itself for predicting the elapsed time per terminal. Real-time transaction data, events, and terminal statuses for the terminals of the store are obtained at the interval of time, and current traffic and usage patterns are inserted into the real-time data and fed as input to the MLM. The MLM returns terminal identifiers for the terminals and corresponding elapsed periods of time until a projected replenishment activity is likely to occur. The terminal identifiers and corresponding elapsed periods of time are rendered within an interface accessible to the store for media management.

20 Claims, 3 Drawing Sheets

MEDIA REPLENISHMENT PREDICTOR

BACKGROUND

Retailers are struggling to effectively manage the cash levels at Self-Checkout (SCO) lanes. Currently, the existing mechanism that triggers a warning of low or excess cash in a transaction terminal is suboptimal. The retailers have to replenish or remove cash from the terminals during peak store hours, which downgrades the terminals to payment card usage only or which shuts down the terminals.

These suboptimal approaches impact operations by having too many cash service activities than are necessary or by not having enough service activities to support traffic at the terminals. Cash service activities are necessary for replenishment of cash denominations that are running low or for removal of excess denominations to prevent the terminal's overflow media bin from reaching its limit and automatically shutting down the terminals.

The consequences of not having optimal cash service activities are many as it wastes labor, reduces the operational time of the terminals, creates suboptimal cash pickup and delivery from banks to the stores, and creates suboptimal cash levels at the terminals.

Replenishment operations can take several minutes (5-15 minutes per operation. For stores with multiple terminals, this translates into many hours per store per month, which is significant labor costs. When replenishment operations are performed during store hours, the terminals are non-operational and therefore not available to customers. Frequent operations accumulate to several hours per month where the terminals are not available to the customers, which increases lines at operational terminals and causes customer dissatisfaction. Bank replenishment schedules determine when an entire store is replenishment with cash, so not having an optimal schedule can lead to higher costs for the retailer and/or shortages of cash for replenishments. Unable to provide the proper change to a customer forces an intervention with a store attendant, or worse, requires asking the customer to checkout at a different terminal.

Current approaches rely on preconfigured minimum and maximum media levels and when the levels are within a preconfigured amount of reaching the levels, a device warning is triggered. These are fixed levels and amounts configured on all terminals. The thresholds (levels and amounts) are largely determined based on the capacities of each terminal's media cassettes and overflow bins.

Thus, the existing approaches are largely static and not dynamic and fail to consider current conditions within the store and of the terminals.

SUMMARY

In various embodiments, system and methods for a media replenishment predictor are presented.

According to an aspect, a method for predicting media replenishment is presented. Rea-time data associated with transactions occurring at transaction terminals and media events for media of the transaction terminals are received. A transaction pattern and a media usage pattern is calculated from the real time data for each of the transaction terminals. The real-time data with the transaction patterns and media usage patterns are passed as input to a machine-learning model (MLM). Output is received from the MLM that comprises a transaction terminal identifier for each of the transaction terminals along with a predicted elapsed time until the corresponding transaction terminal associated with the corresponding transaction terminal identifier is expected to require a media intervention. The terminal identifiers with the corresponding predicted elapsed times are provided through an interface.

DETAILED DESCRIPTION

Figure 1:
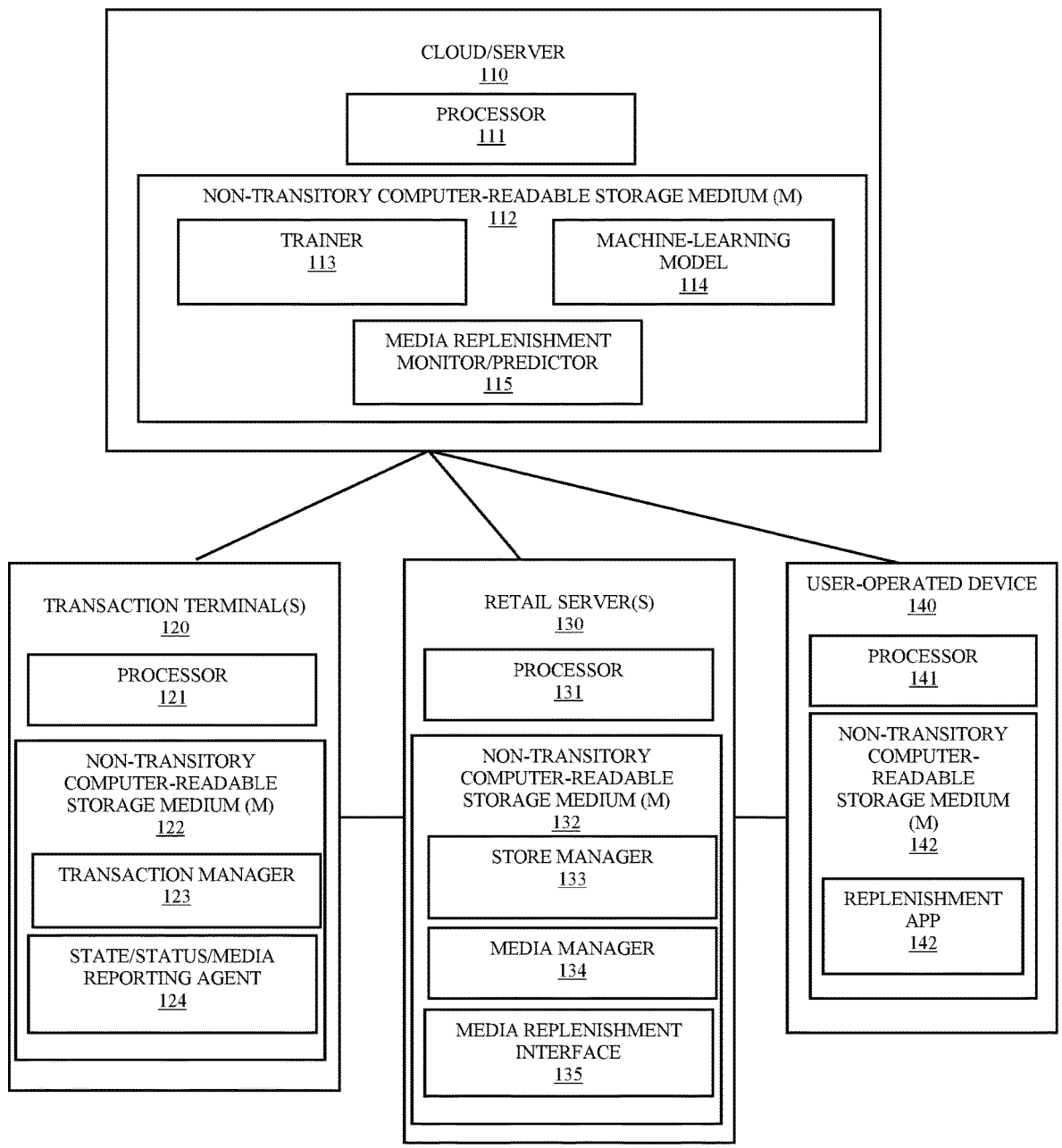
FIG. 1 is a diagram of a system for predicting media replenishment, according to an example embodiment.

FIG. 1 is a diagram of a system 100 for predicting media replenishment, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of predicting media replenishment presented herein and below.

Existing media replenishment techniques are static and not dynamic because they rely on and based primarily on preconfigured thresholds for media levels and media amounts present within the transaction terminals. They fail to account for a variety of factors of conditions.

For example, existing techniques fail to account for media usage patterns during specific times that a store is open for business. There is no ability to identify media usage patterns and media traffic during peak times and low times of the business day. If a preconfigured threshold is reached indicating that a certain denomination of media is approaching the maximum or minimum level of a terminal, existing approaches trigger a replenishment activity, without considering that the time of the business day is a significant factor. When the time of the business day is associated with high terminal usage, the replenishment activity should be addressed immediately but if the time of the business day is associated with low terminal activity, the replenishment activity can perhaps wait several hours before being addressed.

As another example, usage or activity patterns at each terminal of the store are not considered by existing approaches. But, in most stores, certain terminals get significantly more traffic (activity or usage) than other terminals of the store. The higher traffic terminals are typically positioned at the front of the store; customers checkout at the first terminal they can see. When these frequently used terminals are approaching the maximum and minimum media levels, the store manager has to make a decision of performing replenishment during store hours (temporarily shutting down the terminals) or waiting until the end of the business day and running the risk that the terminals will not have proper change to service the customers during the remaining store hours for the business day.

In yet another example, existing techniques fail to consider the interdependencies between cash bill denominations and coin denominations. The preconfigured minimum (min)/maximum (max) thresholds are configured per denomination. When a single denomination reaches a preconfigured threshold for a given bill or a given coin, a warning is triggered. But, in many cases, low levels of one denomination can be compensated by another. For instance, if a terminal is running low on dimes but has an abundance of nickels that terminal can still server customers for quite some time and the replenishment warning is less urgent.

Existing approaches also fail to account for the interdependencies between terminal statuses. Often, there are situations when there are many terminals at a store that are closed (down status) or available for payment card usage only (card only status). This results in the terminals that are open (open status) experiencing an abundance of more cash transactions (more cash transactions than is typical). So, when the open terminals raise a warning with respect to approaching the minimum and maximum levels, the store manager is unable to perform the replenishment activity on the terminals before the terminals automatically shut down because the min/max levels are reached much quicker than would normally be the case.

Still further, existing approaches fail to account for interdependencies between the type of transaction terminals (Point-Of-Sale (POS) terminals for cashier-assisted transactions and Self-Service Terminals (SSTs) for self-service transactions) available in the store. In situations where the POS terminal are experiencing substantial traffic and the customer lines are long, the SSTs are going to draw more cash traffic. Thus, warnings with respect to denominations running low at the SSTs are going to be too late for the store manager to respond to with the appropriate replenishment activity because the min/max level is going to be reached much quicker than would be typical.

System 100 is data-driven and provides a real time and intuitive prediction as to when (time) a given terminal is going to require a replenishment action. System 100 considers the factors which conventional approaches fail to consider and many other factors. Instead of warnings based on preconfigured device-level and denomination-based thresholds, a real-time monitor is provided by system 100 along with a predicted estimated time until a given terminal will become non-operational (whether due to an inability to provide change to a customer or due to an overflow bin reaching its max level). With system 100, a store manager has access to a simpler and more actionable view of any needed replenishment activity. This is all the store manager really needs to understand; when the manager might require a replenishment activity (adding or removing media). Without system 100 the store manager needs to interoperate dozens of denomination-level warnings for multiple terminals of the store and intuitively infer from these warnings when to take action. The managers often get it wrong with too many or too few replenishment activities. With system 100, the store manager gets the exact and only insight needed—how much time is needed before a terminal is shut down so that the manager only acts when required.

System 100 derives a machine-learning model (MLM) trained on a variety of data associated with actual observed min/max media events being reached on terminals, actual observed traffic at the terminals, and actual observed cash usage patterns. The output of the MLM is a prediction of a remaining operational time per terminal of a given store before the min/max event will occur at the corresponding terminal. A variety of data sources produced by a store and/or a retailer associated with the store are used to acquire the input factors/features to the MLM. These data sources include, by way of example only, historical transaction data and cash device usage per terminal, per hour, per half hour, or even per quarter of an hour; real-time cash activity and levels per cash denomination and per terminal; real-time status of the terminals at a given store (statuses include, closed, down, and/or degraded to no cash or payment card only); historical cash management activities (replenishment activities (adding cash or removing cash from overflow bin)); and historical device error records of the terminals (specifically errors that happen due to low/high cash levels). The predicted remaining time until each terminal is projected to encounter a min/max event is provided via a variety of interfaces, such as mobile apps, browsers, and/or dashboards for viewing by store managers. The predicted remaining time to a min/max event is updated at configured intervals of time within the interfaces, such that at any given point in time the manager has an updated prediction for the terminals of a given store.

As used herein "valuable media," "media," and "cash" may be used interchangeably and synonymously. This is intended to mean currency, such as any government-backed notes/bills and/or any government-backed coins. A "media type" can either be a bill or a coin. Each media type includes its own unique denominations; for example U.S.-backed currency includes bill type denominations of $1, $5, $10, $20, $50, and $100 and include coin type denominations of 1 cent, 5 cents, 10 cents, 25 cents, 50 cents, and $1.

A "replenishment activity" includes adding media to a terminal by denomination or removing media from an overflow bin of a terminal that has reached its maximum physically capable storage.

It is within the above-noted context that system 100 is discussed with reference to FIG. 1.

System 100 comprises a cloud/server 110, transaction terminals 120, retail servers 130, and user-operated devices 140.

Cloud/Server 100 comprises a processor 111 and a non-transitory computer-readable storage medium 112. Medium 112 comprises executable instructions for a model trainer 113, a MLM 114, and a media replenishment monitor/predictor 115. Processor 111 obtains or is provided the executable instructions from medium 112 causing processor 111 to perform operations discussed herein and below with respect to 113-115.

Each transaction terminal 120 comprises a processor 121 and a non-transitory computer-readable storage medium 122. Medium 132 comprises executable instructions for a transaction manager 123 and a sate/status/media reporting agent 124. Processor 121 obtains or is provided the executable instructions from medium 122 causing processor 121 to perform operations discussed herein and below with respect to 123-124.

Each retailer server 130 comprises a processor 131 and a non-transitory computer-readable storage medium 132. Medium 132 comprises executable instructions for a store manager 133, a media manager 134, and a media replenishment interface 135. Processor 131 obtains or is provided the executable instructions from medium 132 causing processor 131 to perform operations discussed herein and below with respect to 133-135.

Each user-operated device 140 comprises a processor 141 and a non-transitory computer-readable storage medium 142. Medium 142 comprises executable instructions for a replenishment application (app) 143. Processor 141 obtains or is provided the executable instructions from medium 142 causing processor 141 to perform operations discussed herein and below with respect to 143.

Initially, MLM 140 is derived through training on a variety of data sources produced by stores associated with the terminals 120. Each store may have one to many terminals 120. Each retailer associated with retail server 130 may have one to many stores. The stores of a given retailer are managed through store manager 133. Data is collected and stored in data stores by the stores and the corresponding retailers. A given terminal 123 processes a transaction during a checkout with a customer of the corresponding store.

The transaction manager 123 generates transaction data for each processed transaction that is stored in the transaction data store associated with the store. The transaction data may comprise a variety of information such as an by way of example only, transaction date, transaction start time, transaction end time, terminal identifier for the corresponding terminal 120, store identifier for the corresponding store, retailer identifier for the corresponding retailer, terminal type (POS terminal or SST), transaction item identifiers for items of the transaction, transaction item details (price, descriptions, discounts, etc.), transaction type (purchase or refund), transaction payment type (card or cash), change amount if any, etc.).

Statue/Status/Media reporting agent 124 reports events and metrics during each transaction or at preconfigured intervals of time to the corresponding store manager 133 and/or media manager 134 of the retailer server 130 to which the terminal 120 is associated. By way of example only, the events and metrics may include current denomination totals (by bill and by coin) residing in the recycler, depository, or cash drawer of the terminal 120; state or status of the terminal 120, such as operational, closed (non-operational), open for card payments only, reached a preconfigured min/max of cash, within a threshold amount of reaching the min/max for cash, etc.; any errors currently being experienced by the terminal 120, such as unable to complete a current transaction due to inability to provide change or unable to accept cash a current transaction due to resulting overflow in an overflow media bin of the terminal 120.

Media manager 134 generates replenishment data relevant to replenishment activities for each terminal 120 of each store associated with a given retailer server 130. The replenishment data, by way of example only, may comprise data that identifies each performed replenishment activity per terminal, such as terminal X needed $10 bills and was taken out of service on a specific calendar date and specific time of day, or an overflow bin of terminal X needed emptied on a specific calendar date and specific time of day; a currently cash service visit is scheduled at a store Y for terminals X and Z on a specific calendar date and time of day; etc. Media manager 134 may also generate and maintain cash activity and levels per denomination and per terminal 120.

The historical data associated with the data sources (generated and provided by manager 123, agent 124, manager 133, and manager 134, as discussed above) is maintained on a per store basis by the corresponding retail server 130. The historical data per store is obtained or provided to trainer 113 during a training session for a MLM 140 (a separate MLM 140 per store is derived or developed during any given training session, such that each MLM 140 is store specific).

Trainer 113 filters the historical data to identify calendar days during which a given store experienced a replenishment activity (at least one terminal 120 of the store experienced a status associated with adding media or removing media). The filtered data on these calendar days is further processed by trainer 113 to compute a terminal traffic rate per terminal 120 for a given interval of time of each given day (a total number of transactions processed by a specific terminal within the interval (such as every 15 minutes) versus/divided by a total number of transactions experienced on all terminals 120 of the store for that same interval of time). The computed traffic rates are labeled and inserted into the filtered data. Trainer 113 may also compute a payment type percentage for each interval of time; for example, of 10 transactions within a given 15-minute interval on terminal X, 7 were paid by cash and 8 were paid by card, such that during the given interval of time a cash usage pattern can be expressed as 7/15 or 47%. The cash usage pattern is labeled and inserted into the filtered data.

After the filtered data and inserted traffic rates and cash usage patterns are inserted and labeled within the filtered data. Trainer 113 processes the data to identify during which intervals of time replenishment activities occurred for each terminal 120. The intervals of time that preceded the time of day of a replenishment activity are identified. Each current time of day for each transaction within the preceding intervals of time identified are subtracted from the current time of day of the corresponding replenishment activity to compute for each transaction within each interval of time an elapsed time that preceded the replenishment activity. This elapsed time is labeled within the intervals by trainer 113 per terminal.

The filtered, labeled, and preprocessed data is then passed to the MLM 114 during the training session by trainer 113. The expected output by the MLM 114 for each terminal 120 during each interval of time is the labeled elapsed period of time until the replenishment activity occurred for the corresponding terminal 120. All of the remaining data including the labeled cash usage pattern and traffic rate/pattern is used as features inputted to the MLM 140 during the training session. The MLM 140 configures itself and weights the input features to attempt to produce as expected the labeled elapsed period of time until the replenishment activity occurred. The training session continues for each interval of each day during which the replenishment activities were detected.

Once MLM 140 is trained for a given store on that stores terminals 120 for replenishment activities, metrics, events, and transaction data, MLM 140 is released for use by each of the stores and their managers.

During operation, real-time transaction data, metrics, and events are provided or obtained by monitor/predictor 115 for an interval of time. The cash usage pattern/rate and terminal traffic pattern/rate is calculated, labeled, and inserted into the data by monitor/predictor 115 and the modified labeled data for the interval is passed as input to MLM 140. MLM 140 returns as output a terminal identifier for each terminal 120 along with a predicted elapsed period of time until a replenishment activity is projected to be required for the corresponding terminal.

Monitor/Predictor 115 renders the terminal identifiers and the predicted elapsed period of time until a replenishment activity is needed for each terminal identifier within interface 135 and/or a user-facing interface of app 142. The terminal identifiers and elapsed period of time may also be provided through a dashboard view within interface 135 and/or app 142. The predicted elapsed periods of time for the terminals are automatically and dynamically updated by monitor/predictor 115 for each new interval of time (such as every 15 minutes, a half an hour, etc.) within interface 135, app 142, and/or a dashboard view of interface 135 and/or app 142.

In this way, store managers receive real-time and data-driven predictions as to when any given terminal of the store is going to require a replenishment activity that is not based on preconfigured thresholds and that is based on the actual conditions being experienced in the store and at each of the terminals 120 of the store.

In an embodiment, the elapsed periods of predicted times to a replenishment activity can be fed by monitor/predictor 115 to media manager 134 through an Application Programming Interface (API) and processed by media manager 134 to dynamically adjust and dynamically revise any existing schedule associated with cash services required by a store.

In an embodiment, terminals 120 can be SSTs 120 having recyclers, media depositories, media dispensers that necessitate replenishment activities.

In an embodiment, terminals 120 are Automated Teller Machines (ATMs).

In an embodiment, terminals 120 are POS terminals that comprise cash drawers accessed by a cashier of the store.

In an embodiment, terminals 120 are a mixture or some combination of SSTs, ATMs, and/or POS terminals.

In an embodiment, user-operated devices 140 can be any combination of phones, laptops, wearable processing devices, tablets, and/or desktops.

In an embodiment, system 100 is provided to a given retailer associated with retail server 120 as a Software-as-a-Service (SaaS), such that interface 135 and/or 125 is accessible from other interfaces associated with other services provided by cloud/server 100 to the retailer.

The above-referenced embodiments and other embodiments are now discussed with reference to FIGS. 2-3.

Figure 2:
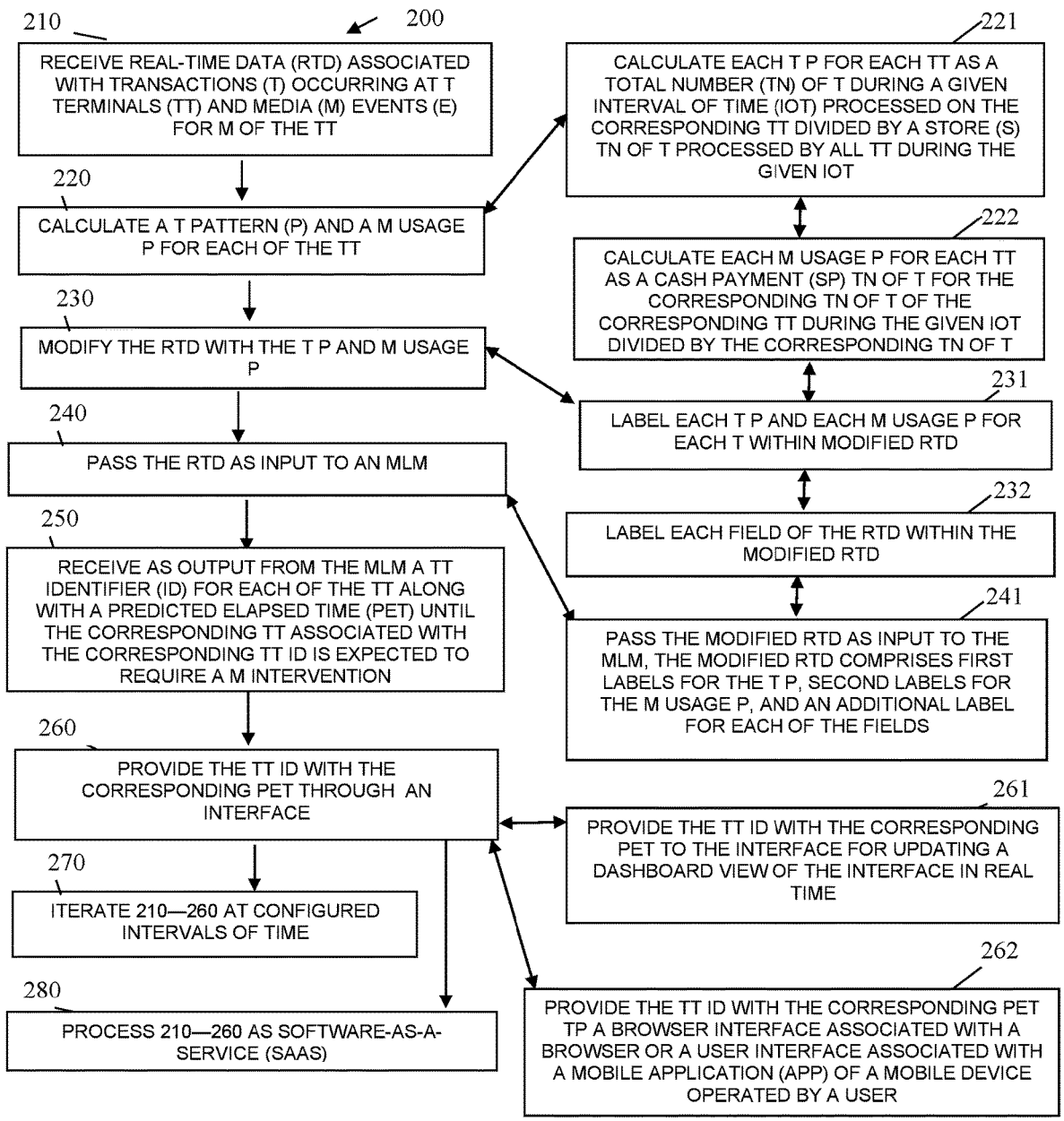
FIG. 2 is a diagram of a method for predicting media replenishment, according to an example embodiment.

FIG. 2 is a diagram of a method 200 for predicting media replenishment, according to an example embodiment. The software module(s) that implements the method 200 is referred to as a "media replenishment activity predictor." The media replenishment activity predictor is implemented as executable instructions programmed and residing within memory and/or a non-transitory computer-readable (processor-readable) storage medium and executed by one or more processors of one or more devices. The processor(s) of the device(s) that executes the media replenishment activity predictor are specifically configured and programmed to process the media replenishment activity predictor. The media replenishment activity predictor has access to one or more network connections during its processing. The connections can be wired, wireless, or a combination of wired and wireless.

In an embodiment, the device that executes media replenishment activity predictor is cloud 110. In an embodiment, the device that executes media replenishment activity predictor is server 110.

In an embodiment, the devices that executes media replenishment activity predictor is a retail server 130.

In an embodiment, the media replenishment activity predictor is all of, or some combination of trainer 113, MLM 114, and/or media replenishment monitor/predictor 115.

In an embodiment, the media replenishment activity predictor is provided to a retail server 130 and/or a user-operated device 140 as a SaaS.

At 210, the media replenishment activity predictor receives real-time data associated with transactions occurring at or being processed on transaction terminals 120 and media events for media of the transaction terminals 120.

At 220, the media replenishment activity predictor calculates a transaction pattern and a media usage pattern for each of the transaction terminals 120.

In an embodiment, at 221, the media replenishment activity predictor calculates each transaction pattern as a total number of transactions during a given interval of time processed on the corresponding transaction terminal 120 divided by a store total number of transactions processed by all of the transaction terminals during the given interval of time.

In an embodiment of 221 and at 222, the media replenishment activity predictor calculates each media usage pattern for each transaction terminal 120 as a cash payment total number of transactions for the corresponding total number of transactions on the corresponding transaction terminal 120 during the given interval of time divided by the corresponding total number of transactions. For example, if a given transaction terminal 120 during a 15-minute interval of time processes 10 transactions and 5 of those transactions cash payments were used, the media usage pattern is 50% (5/10).

At 230, the media replenishment activity predictor modifies the real-time data with the transaction patterns (transaction usage patterns) and the media usage patterns.

In an embodiment of 222 and 230, at 231, the media replenishment activity predictor labels each transaction pattern and each media usage patter for each transaction of each given interval of time within modified real-time data.

In an embodiment of 231 and at 232, the media replenishment activity predictor labels each field of the real-time data within the modified real-time data.

At 240, the media replenishment activity predictor passes the real-time data as input to a MLM 114.

In an embodiment of 232 and 240, at 241, the media replenishment activity predictor passes the modified real-time data as input to the MLM 114. The modified real-time data comprises first labels for the transaction usage patterns, second labels for the media usage patterns, and an additional label for each of the fields.

At 250, the media replenishment activity predictor receives as output from the MLM 114 a transaction terminal identifier for each of the transaction terminals 120 along with a predicted elapsed time until the corresponding transaction terminal 120 associated with the corresponding transaction terminal identifier is expected or projected to require a media intervention.

At 260, the media replenishment activity predictor provides the transaction terminal identifiers with the corresponding predicted elapsed times through an interface.

In an embodiment, at 261, the media replenishment activity predictor provides the transaction terminal identifiers with the corresponding predicted elapsed times to the interface for updating a dashboard view of the interface in real time.

In an embodiment, at 262, the media replenishment activity predictor provides the transaction terminal identifiers with the corresponding predicted elapsed times to a browser interface associated with a browser and/or a user interface associated with a mobile application of a mobile device 140 operated by a user (such as a store manager for the store having the transaction terminals 120).

In an embodiment, at 270, the media replenishment activity predictor iterates back to 210 for processing 210-260 at configured intervals of time.

In an embodiment, at 280, the media replenishment activity predictor processes (210-260) as SaaS.

Figure 3:
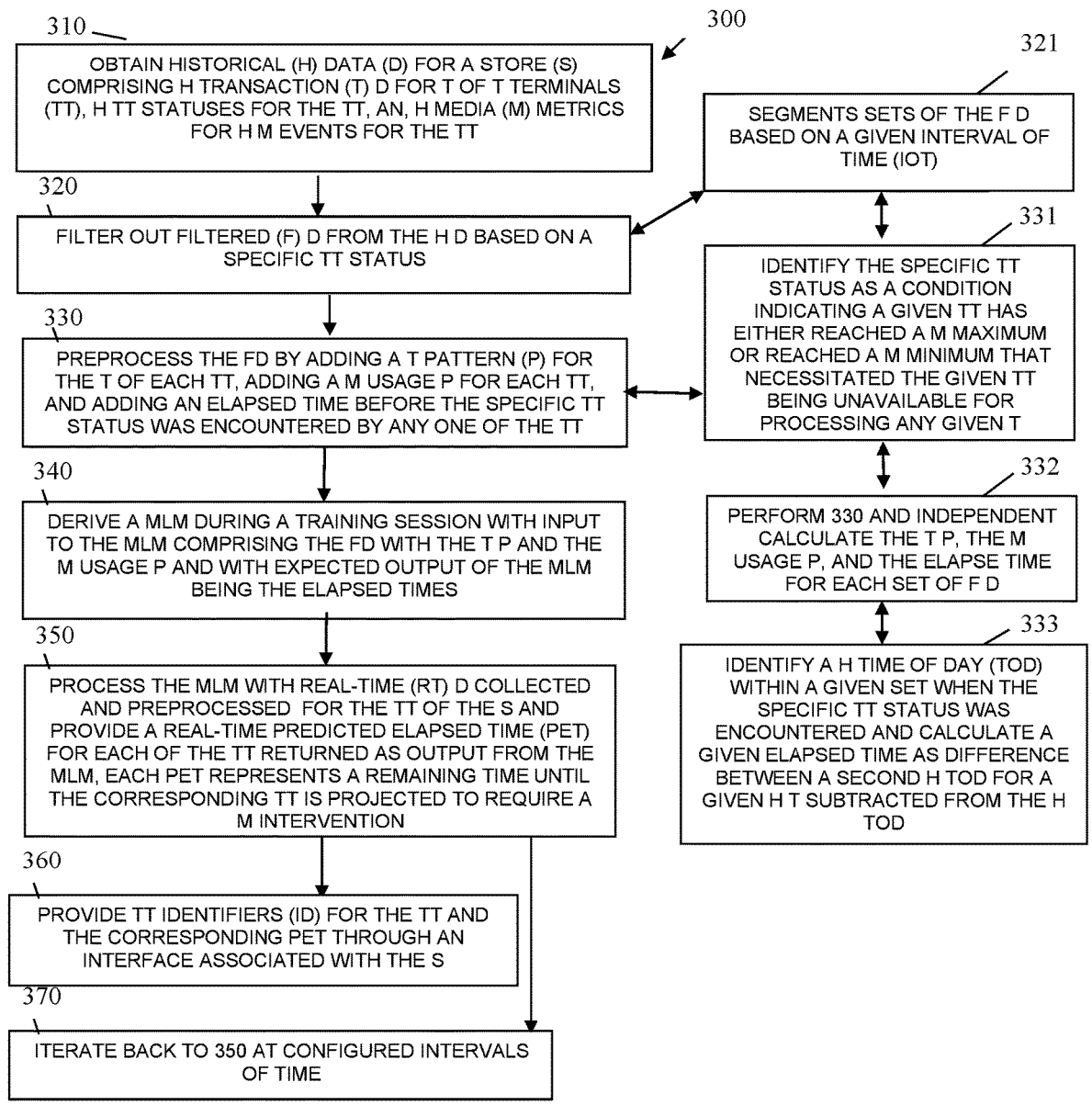
FIG. 3 is a diagram of another method for bias detection in a data-driven model for multiple tenants, according to an example embodiment.

FIG. 3 is a diagram of another method 300 for predicting media replenishment, according to an example embodiment. The software module(s) that implements the method 300 is referred to as a "data-driven MLM replenishment activity prediction service." The data-driven MLM replenishment activity prediction service is implemented as executable instructions programmed and residing within memory and/or a non-transitory computer-readable (processor-readable)

storage medium and executed by one or more processors of one or more devices. The processor(s) of the device(s) that executes the data-driven MLM replenishment activity prediction service are specifically configured and programmed to process the data-driven MLM replenishment activity prediction service. The data-driven MLM replenishment activity prediction service has access to one or more network connections during its processing. The network connections can be wired, wireless, or a combination of wired and wireless.

In an embodiment, the device that executes the data-driven MLM replenishment activity prediction service is cloud 110. In an embodiment, the device that executes the data-driven MLM replenishment activity prediction service is server 110.

In an embodiment, the device that executes the data-driven MLM replenishment activity prediction service is retail server 130.

In an embodiment, the data-driven MLM replenishment activity prediction service is all of, or some combination of trainer 113, MLM 114, media replenishment monitor/predictor 115, and/or method 200.

The data-driven MLM replenishment activity prediction service presents another and, in some ways, enhanced processing perspective from that which was discussed above with the method 200 of the FIG. 2.

In an embodiment, the data-driven MLM replenishment activity prediction service is provided to a retail server 130 and/or a user-operated device 140 as a SaaS.

At 310, the data-driven MLM replenishment activity prediction service obtains historical data for a store. The historical data comprises transaction data for transactions of transaction terminals 120, historical transaction terminal statuses for the transaction terminals 120, and historical media metrics for historical media events of the transaction terminals 120.

At 320, the data-driven MLM replenishment activity prediction service filters out filtered data from the historical data based on a specific transaction terminal status being identified within the historical data.

In an embodiment, at 321, the data-driven MLM replenishment activity prediction service segments sets of the filtered data based on a given interval of time.

At 330, the data-driven MLM replenishment activity prediction service preprocesses the filtered data by adding a transaction usage pattern for the transactions of each transaction terminal 120, adding a media usage pattern for each of the transaction terminals, and adding an elapsed time before the specific transaction terminal status was encountered by any one of the transaction terminals 120.

In an embodiment of 321 and 330, at 331, the data-driven MLM replenishment activity prediction service identifies the specific transaction terminal status as a condition indicating a given transaction terminal 120 has either reached a media maximum or reached a media minimum that necessitated the given transaction terminal 120 being unavailable for processing any given transaction.

In an embodiment of 331 and at 332, the data-driven MLM replenishment activity prediction service performs the adding of 330 and independent calculates the transaction usage pattern, the media usage pattern, and the elapsed time for each set of filtered data.

In an embodiment of 332 and at 333, the data-driven MLM replenishment activity prediction service identifies a historical time of day within a given set when the specific transaction terminal status was encountered and calculates a given elapsed time as a difference between a second historical time of day for a given historical transaction subtracted from the historical time of day.

At 340, the data-driven MLM replenishment activity prediction service derives a MLM 114 during a training session with input to the MLM 114 comprising the filtered data with the transaction usage patterns and the media usage patterns and with expected output of the MLM 114 being the elapsed times.

At 350, the data-driven MLM replenishment activity prediction service processes the MLM 114 with real-time data collected for the transaction terminals 120 of the store. The data-driven MLM replenishment activity prediction service receives as output from the MLM 114 a predicted elapsed time for each of the transaction terminals 120. Each predicted elapsed time represents a remaining time until the corresponding transaction terminal 120 is projected to require a media intervention (encounter the specific transaction terminal status).

In an embodiment, at 360, the data-driven MLM replenishment activity prediction service provides transaction terminal identifiers for the transaction terminals and the corresponding predicted elapsed times through an interface associated with the store.

In an embodiment, at 370, the data-driven MLM replenishment activity prediction service iterates back to 350 at configured intervals of time, such that the predicted elapsed times for the terminals are dynamically updated within the interface at the start of each new configured interval of time.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    receiving, by a processor, real-time data associated with transactions occurring at transaction terminals and associated with media events for media of the transaction terminals;
    calculating, by the processor, a transaction pattern and a media usage pattern from the real-time data for each of the transaction terminals, wherein each media usage pattern includes cash and coin denomination usage patterns for each of the transaction terminals;

analyzing, by the processor, the transaction pattern and the media usage pattern to determine a predictive model for media replenishment based on a machine learning model (MLM) trained on historical transaction data and media events, wherein the MLM is specifically configured to dynamically adjusts predictions based on changes in transaction volume and media usage detected in real time;

modifying, by the processor, the real-time data with the transaction patterns and media usage patterns as labeled features, passing, by the processor, the real-time data and labeled features as input to the MLM;

receiving, by the processor, as output from the MLM a transaction terminal identifier for each of the transaction terminals along with a predicted elapsed time until a corresponding transaction terminal associated with the corresponding transaction terminal identifier is expected to require a media intervention for media replenishment; and rendering, by the processor, the transaction terminal identifiers with the corresponding predicted elapsed times within interfaces, wherein at least one interface is a media replenishment interface;

wherein the predicted elapsed times are automatically and dynamically updated at configured intervals of time within the interfaces to provide real-time and data-driven predictions as to when any given terminal of a store is going to require a replenishment activity that is not based on preconfigured thresholds and that is based on actual conditions being experienced in the store and at each of the terminals of the store.

2. The method of claim 1 further comprising, iterating the method at configured intervals of time.

3. The method of claim 1 further comprising, process the method as a Software-as-a-Service (SaaS).

4. The method of claim 1, wherein calculating further includes calculating each transaction pattern for each transaction terminal as a total number of transactions during a given interval of time processed on the corresponding transaction terminal divided by a store total number of transactions processed by all of the transaction terminals during the given interval of time.

5. The method of claim 4, wherein calculating further includes calculating each media usage pattern for each transaction terminal as a cash payment total number of transactions for the corresponding total number of transactions of the corresponding transaction terminal during the given interval of time divided by the corresponding total number of transactions.

6. The method of claim 5, wherein modifying further includes labeling each transaction pattern and each media usage pattern for each transaction within modified real-time data.

7. The method of claim 6, wherein modifying further includes labeling each field of the real-time data within the modified real-time data.

8. The method of claim 7, wherein passing further includes passing the modified real-time data as input to the MLM, wherein the modified real-time data comprises first labels for the transaction patterns, second labels for the media usage patterns, and an additional labels for each of the fields.

9. The method of claim 1, wherein rendering further includes rendering the transaction terminal identifiers with the corresponding predicted elapsed times within a dashboard view of a given interface.

10. The method of claim 1, wherein rendering further includes rendering the transaction terminal identifiers with the corresponding predicted elapsed times within a browser interface associated with a browser or within a user interface associated with mobile application of a mobile device operated by a user.

11. A method, comprising:

obtaining, by a processor, historical data for a store comprising historical transaction data for transactions of transaction terminals, obtaining historical transaction terminal statuses for the transaction terminals, and obtaining historical media metrics and historical media events for the transaction terminals;

filtering, by the processor, out filtered data from the historical data based on a specific transaction terminal status, preprocessing, by the processor, the filtered data by adding a transaction pattern for the transactions of each transaction terminal, adding a media usage pattern for each transaction terminal, and adding an elapsed time before the specific terminal status was encountered by any one of the transaction terminals, wherein each media usage pattern includes cash and coin denomination usage patterns for each of the transaction terminals;

training, by the processor, a machine learning model (MLM) during a training session with input to the MLM comprising the filtered data with the transaction patterns and the media usage patterns and the media usage patterns and with expected output of the MLM being the elapsed times, wherein the MLM is configured to dynamically adjust predictions based on real-time transaction and media event data;

and processing, by the processor, the MLM with real-time data collected and preprocessed for the transaction terminals of the store and providing a real-time predicted elapsed time for each of the transaction terminals returned as output from the MLM to interfaces associated with the store, each real-time predicted elapsed time represents a remaining time until a corresponding transaction terminal is projected to require a media intervention for media replenishment;

wherein the predicted elapsed times are automatically and dynamically updated at configured intervals of time within the interfaces to provide real-time and data-driven predictions as to when any given terminal of the store is going to require a replenishment activity that is not based on preconfigured thresholds and that is based on actual conditions being experienced in the store and at each of the terminals of the store.

12. The method of claim 11 further comprising, providing, by the processor, transaction terminal identifiers for the transaction terminals and the corresponding predicted elapsed time through a dashboard interface and a media replenishment interface associated with the store.

13. The method of claim 11 further comprising, iterating, by the processor, back to the processing at configured intervals of time.

14. The method of claim 11 further comprising, providing the processing as a Software-as-a-Service (SaaS) to a retail service associated with a retailer of the store.

15. The method of claim 11, wherein filtering further includes segmenting sets of the filtered data based on a given of time.

16. The method of claim 15, wherein filtering further includes identifying the specific transaction terminal status as a condition indicating a given transaction terminal has either reached a media maximum or reached a media minimum that necessitated the given terminal being unavailable for processing any given transaction.

17. The method of claim 16, wherein preprocessing further includes performing the adding and independently calculating the transaction patterns, the media usage patterns, and the elapsed times for each set of the filtered data.

18. The method of claim 17, wherein independently calculating further includes identifying a historical time of day within a given set when the specific transaction terminal status was encountered and calculating a given elapsed time as a difference between a second historical transaction time of day for a given historical transaction subtracted from the historical time of day.

19. A system, comprising:
- a cloud server comprising at least one processor and a non-transitory computer-readable storage medium;
- the non-transitory computer-readable storage medium comprises executable instructions;
- the executable instructions when executed by the at least one processor cause the at least one processor to perform operations comprising:
- obtaining historical data for transaction terminals of a store, wherein the historical data comprises transaction data, media events, and transaction terminal statuses for the transaction terminals;
- filtering the historical data into filtered data by calendar dates during which a media intervention was identified for any given transaction terminal based on a specific transaction terminal status;
- preprocessing the filtered data for a given interval of time on each calendar date to calculate and to include transaction patterns, media usage patterns, and elapsed times before a media intervention was detected for the specific transaction terminal status for each transaction terminal, wherein each media usage pattern includes cash and coin denomination usage patterns for each of the transaction terminals;
- training a machine-learning model (MLM) on the filtered data for each interval of time on each calendar data as input to the MLM and with the elapsed times labeled within the filtered data as expected output from the MLM, wherein the MLM utilizes a predictive model based on historical data and is configured to dynamically update predictions based on real-time data;
- obtaining real-time data from the transaction terminals during a current interval of time;
- preprocessing the real-time data to include current transaction patterns and media usage patterns for each of the transaction terminals;
- providing the real-time data, the current transaction patterns, the current media usage patterns as input features to the MLM;
- receiving as output from the MLM transaction terminal identifiers for the transactions terminals and predicted elapsed times for the transaction terminal identifies that predict when the transaction terminals are projected to require the media intervention;
- rendering the transaction terminal identifiers and the predicted elapsed times within a plurality of interfaces, wherein at least one interface is a media replenishment interface; and
- iterating back to the obtaining of the real-time data for a next current interval of time when the current interval of time expires;
- wherein the predicted elapsed times are automatically and dynamically updated at configured intervals of time within the interfaces to provide real-time and data-driven predictions as to when any given terminal of the store is going to require a replenishment activity that is not based on preconfigured thresholds and that is based on actual conditions being experienced in the store and at each of the terminals of the store.

20. The system of claim 19, wherein the transaction terminals comprises Point-Of-Sale (POS) terminals, Self-Service Terminals (SSTs), Automated Teller Machines (ATMs), or any combination of the POS terminals, the SSTs, and the ATMs.

* * * * *